United States Patent [19]

Vadasz

[11] Patent Number: 4,516,479
[45] Date of Patent: May 14, 1985

[54] PUMP

[75] Inventor: Amnon F. Vadasz, Caracas, Venezuela

[73] Assignee: Intevep, S.A., Caracas, Venezuela

[21] Appl. No.: 501,650

[22] Filed: Jun. 6, 1983

[51] Int. Cl.³ .............................. F16J 10/04; F16J 1/00
[52] U.S. Cl. .......................................... 92/170; 92/87; 92/171; 92/172; 417/DIG. 1; 417/259; 91/422
[58] Field of Search ................... 92/171, 87, 170, 172; 417/DIG. 1, 259; 91/422

[56] References Cited

U.S. PATENT DOCUMENTS 2,188,105  1/1940  Caldwell ............................... 92/171
3,507,584  4/1970  Robbins, Jr. ......................... 92/171

Primary Examiner—Paul E. Maslousky
Attorney, Agent, or Firm—Bachman and LaPointe

[57] ABSTRACT

A pump for pumping fluids which contain a high degree of suspended solid particles comprises a piston provided with a cylindrical sleeve of a hard ceramic material having a hardness of greater than nine on the Mho scale, preferably an aluminum oxide ceramic or a zirconium nitrate ceramic, and a cylinder provided with a cylindrical sleeve of like ceramic material.

4 Claims, 1 Drawing Figure

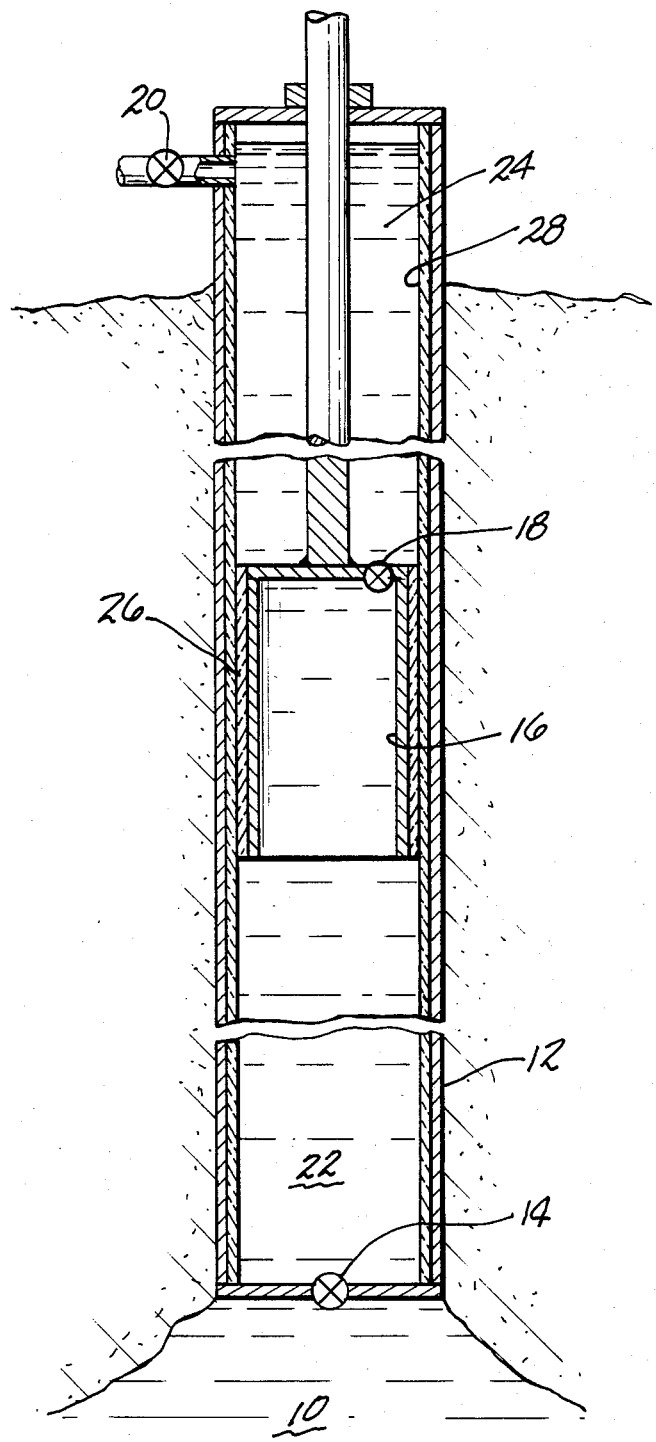

PUMP

BACKGROUND OF THE INVENTION

The present invention relates to pumps, and more particularly, to reciprocating piston pumps used for pumping fluids which contain a high degree of suspended solids, and/or are at elevated temperatures and/or are corrosive.

When pumping certain fluids, for example heavy crude oils characterized by high contents of suspended solids, there is a problem with wear between the piston and cylinder of the pump. The wear results from the suspended particles in the pumped fluid which have a hardness which is greater than that of the metals used in the construction of various pump parts. These hard suspended particles find their way, for example, between the piston and cylinder wall of the pump and damage the piston and cylinder wall due to the hardness of the particles relative to the hardness of the metals used to construct the pump parts. The deterioration and wear of the pump parts is further increased when the pumped fluids are corrosive in nature and/or are at elevated temperatures. The wear on the piston and cylinder wall results in the passing of the pumped fluid between the piston and cylinder wall of the pump which results in a loss in volumentric efficiency of the pump.

In an attempt to overcome problems of wear associated with reciprocating piston pumps used for pumping fluids which contain a high degree of suspended solids, it has become commonplace in the prior art to provide removable metal liners for the pump cylinder which are readily inserted and replaced when worn. A typical arrangement of the type described above is disclosed in U.S. Pat. No. 1,528,097 to Cooper. In accordance with the '097 patent, a removable pump cylinder bushing made of a relatively low cost material is provided with a metal lining. The bushing is adapted to be readily replaced in the pump cylinder when the metal lining is worn. While the foregoing arrangement allows for a readily replaceable pump cylinder lining, it does not eliminate the wear problem on the cylinder nor on the operating piston. It is further known in the prior art to apply a wear-resistant alloy coating to bearing members in a piston pump as disclosed in U.S. Pat. No. 3,938,814 to Cromwell. Likewise, it has been proposed to spray a wearresistant layer of a ceramic material such as aluminum oxide on the running face of a sealing strip used on a vane in a rotary engine as disclosed in U.S. Pat. No. 4,016,635 to Leitermann et al. While the foregoing prior art patents teach the provision of applying wear-resistant coatings to working surfaces of pumps, the prior art fails to provide a mechanism for preventing wear in reciprocating piston pumps used for pumping fluids which contain a high degree of suspended solids while at the same time prohibiting the suspended solids from lodging between the piston and cylinder wall or, in the alternative, pulverize and destroy any solids which might lodge in that area.

Naturally, it is highly desirable to provide a reciprocating piston pump used for pumping fluids which contain a high degree of relatively hard suspended solids wherein the piston and cylinder wall of the pump are highly resistant to wear. The contacting surfaces of the piston and cylinder wall closely mate so as to prevent the suspended solids lodging between the piston or cylinder wall.

Accordingly, it is a principal object of the present invention to provide a reciprocating piston pump for pumping fluids containing a high degree of hard suspended particles which is highly resistant to wear.

It is a particular object of the present invention to provide a reciprocating piston pump wherein the metal piston is provided with an outer sleeve of a wear-resistant material which is slidingly received within a cylindrical sleeve of the same wear-resistant material mounted within the cylinder.

It is a further object of the present invention to provide a reciprocating piston pump wherein the contacting surface of the piston sleeve and cylindrical sleeve closely mate.

It is a still further object of the present invention to provide a reciprocating piston pump wherein the piston sleeve and cylindrical sleeve are made of a material characterized by a hardness of greater than nine on the Mho scale which is sufficient to pulverize any particles present in the pumped fluid.

It is still another further object of the present invention to provide a reciprocating piston pump wherein the piston sleeve and cylindrical sleeve are corrosion resistant.

Further objects and advantages will appear hereinbelow.

SUMMARY OF THE INVENTION

In accordance with the present invention the foregoing objects and advantages are readily obtained.

The present invention relates to a reciprocating piston pump for pumping fluids which contain a high degree of suspended particles. In accordance with the present invention, the metal piston of the pump is provided on the exterior surface thereof with a cylindrical sleeve of a hard ceramic material characterized by a hardness of greater than nine on the Mho scale. The ceramic material is preferably an aluminum oxide ceramic or a zirconium nitrate ceramic. The cylindrical sleeve is fitted over the exterior surface of the piston preferably by press-fitting, however, the sleeve could be glued in place or held in place by a threaded device. In addition, the cylinder of the piston pump has, on the interior surface thereof, a cylindrical sleeve also made of the like hard ceramic material. Again the sleeve is preferably press-fit in the cylinder or secured therein in any of the manners described above. The surfaces of the sleeves on both the exterior surface of the piston and the interior surface of the cylinder are highly polished so as to allow for a sealing interface between the piston and the cylinder wall.

In accordance with the present invention, the hard ceramic material, preferably an aluminum oxide ceramic or a zirconium nitrate ceramic, having a hardness of greater than nine on the Mho scale, is not susceptible to damage from the suspended solid particles in the pumped fluid. In addition, as the ceramic material reacts only with hydrogen fluoride gas, it is possible to pump corrosive fluids without adversely effecting the working parts of the pump. Furthermore, since the hard ceramic sleeves can be highly polished, the interface between the piston sleeve and the cylinder wall sleeve forms a seal which tends to prohibit any of the suspended particles from lodging in the interface between the piston sleeve and the cylinder wall sleeve. Finally, in the event any suspended solid particles do become lodged in the interface between the piston sleeve and cylinder wall sleeve, the particles would become pulverized due to the greater hardness of the ceramic material (greater than nine on the Mho scale) and thereby avoid damage to the working parts of the pump.

BRIEF DESCRIPTION OF THE DRAWING

The FIGURE is a schematic illustration of a reciprocating piston pump employing the features of the present invention.

DETAILED DESCRIPTION

For purposes of illustration, the invention will be described in terms of a pump apparatus for pumping oil from oil wells, however, it should be understood that the description is presented merely for illustrating the features of the present invention and in no way is the invention described intended to be limited to the particular pumping apparatus discussed hereinbelow.

Referring to the FIGURE, there is shown an oil well tunnel 10 which is in communication with a pump cylinder 12 by means of valve 14. Mounted for reciprocal movement within cylinder 12 is piston 16 which carries valve 18. At the top of the cylinder 12, an outlet valve 20 may be provided for delivering the pumped oil to storage. On the upstroke of the piston 16, oil is drawn into the lower chamber 22 of the cylinder 12 from the well tunnel 10 via inlet valve 14. On the downstroke of the piston 16 the oil is forced through valve 18 in piston 16 into the upper chamber 24 of cylinder 12. On the next upward stroke of the piston 16 the oil is forced from upper chamber 24 of cylinder 12 through outlet valve 20 while at the same time drawing more oil into lower chamber 22 of cylinder 12 through inlet valve 14.

In accordance with the specific features of the present invention, the piston 16 is provided on the exterior surface thereof with a cylindrical sleeve 26 which is preferably pressfit over the entire exterior surface of the piston 16. As noted above, the sleeve could also be glued in place or held in place by a threaded device. The cylindrical wall 12 is likewise provided with a cylindrical sleeve 28 fitted therein. In accordance with the present invention sleeves 26 and 28 are formed of a hard ceramic material having a hardness of greater than nine on the Mho scale and are preferably made of an aluminum oxide ceramic or a zirconium nitrate ceramic. The contact surfaces of the sleeves of the hard ceramic material are highly polished so as to form a substantial seal between the piston and the cylinder.

By way of the present invention, wear between the working parts and the piston pump is substantially eliminated. In addition, due to the nature and hardness of the ceramic sleeves any solid particles which lodge in the interface between the piston sleeve and cylinder wall sleeve are pulverized without damaging the mating surfaces of either the piston sleeve or the cylinder wall sleeve. In addition, as the ceramic material reacts only with hydrogen fluoride gas, corrosive fluids which attack metals may be readily pumped. In addition to the foregoing, in the event the piston sleeve or cylinder wall sleeve is damaged for any reason they can be readily replaced at minimal cost.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In a reciprocating piston pump for pumping fluids which contain a high degree of suspended particles including a cylinder having a fluid inlet and a fluid outlet and a piston movable within said cylinder for pumping fluid from said fluid inlet to said fluid outlet, the improvement which comprises a hollow elongated metal piston having an exterior peripheral surface and a valve, a cylinder having an interior surface, a first cylindrical sleeve mounted over the exterior peripheral surface of said piston and a second cylindrical sleeve lining the interior surface of the cylinder wherein said first cylindrical sleeve and said second cylindrical sleeve are made of a hard ceramic material having a hardness of greater than nine on the Mho scale such that any suspended particles which lodge between said first cylindrical sleeve and said second cylindrical sleeve are pulverized as said piston moves within said cylinder.

2. A pump according to claim 1 wherein said hard ceramic material is selected from the group consisting of aluminum oxide ceramic and zirconium nitrate ceramic.

3. A pump according to claim 1 wherein the contact surface of said first cylindrical sleeve and said second cylindrical sleeve are highly polished so as to allow for a sealing interface between the piston and the cylinder of the pump.

4. A pump according to claim 1 wherein said first cylindrical sleeve and said second cylindrical sleeve are press-fitted on the exterior peripheral surface of said piston and said interior surface of said cylinder respectively and are readily removable.

* * * * *